United States Patent [19]

Rygiel

[11] Patent Number: 4,773,659
[45] Date of Patent: Sep. 27, 1988

[54] ARTICULATED SKI

[76] Inventor: Witold W. Rygiel, 1840 Mesquite Ave., Suite A, Lake Havasu City, Ariz. 86403

[21] Appl. No.: 104,647

[22] Filed: Oct. 5, 1987

[51] Int. Cl.⁴ .............................................. B62B 13/04
[52] U.S. Cl. .................................. 280/12 H; 280/16; 280/23; 280/25
[58] Field of Search ................... 280/12 H, 16, 21, 23, 280/25, 12 K, 606, 87.04 R

[56] References Cited

U.S. PATENT DOCUMENTS

| | | | |
|---|---|---|---|
| 1,422,203 | 7/1922 | Hieatzman | 280/16 |
| 1,479,162 | 1/1924 | Swanson | 280/12 H |
| 1,851,963 | 4/1932 | Anderson | 280/12 K |
| 2,006,325 | 6/1935 | Scholtes | 280/23 |
| 2,220,634 | 11/1940 | Anderson | 280/606 |
| 2,256,203 | 9/1941 | Hylan | 280/23 |
| 2,894,760 | 7/1959 | Kolstad | 280/606 |
| 3,178,196 | 4/1965 | Colace | 280/16 |
| 3,269,742 | 8/1966 | Funyak et al. | 280/606 |
| 3,398,970 | 8/1968 | Horiuchi | 280/16 |
| 3,689,092 | 9/1972 | Lake | 280/606 |
| 3,931,862 | 1/1976 | Cote | 280/25 |
| 4,138,128 | 2/1979 | Criss | 280/16 |
| 4,221,394 | 9/1980 | Campbell | 280/12 H |
| 4,537,412 | 8/1985 | Hill | 280/7.12 |
| 4,650,198 | 3/1987 | Sherretts | 280/12 K |

FOREIGN PATENT DOCUMENTS

| | | | |
|---|---|---|---|
| 183713 | 7/1936 | Switzerland | 280/23 |
| 458946 | 8/1968 | Switzerland | 280/16 |
| 1293184 | 10/1972 | United Kingdom | 280/16 |

*Primary Examiner*—David M. Mitchell
*Attorney, Agent, or Firm*—Emmette R. Holman

[57] ABSTRACT

The stand up articulated ski described herein consists of a steerable first ski in front, a combination of steering shaft with handlebars attached to the first ski, a second ski following the first with tandem, spaced, front and rear toe cups on top, a brake attached to the tail of the second ski, pivot pin assembly joining the second ski to the steering shaft, and a coil spring on the steering shaft, interposed between the pivot pin assembly and the first ski. The pivot pin assembly consists of a case tube assembly coaxial with the steering shaft, a pair of spaced pivot pin plates, each supporting an upwardly directed pivot pin coaxial with the rotational axis integrally attached to the case tube and adapted to engage corresponding ones of a pair of pivot bearings integrally attached to a bearing fixture that is attached to the tip of the second ski.

19 Claims, 6 Drawing Sheets

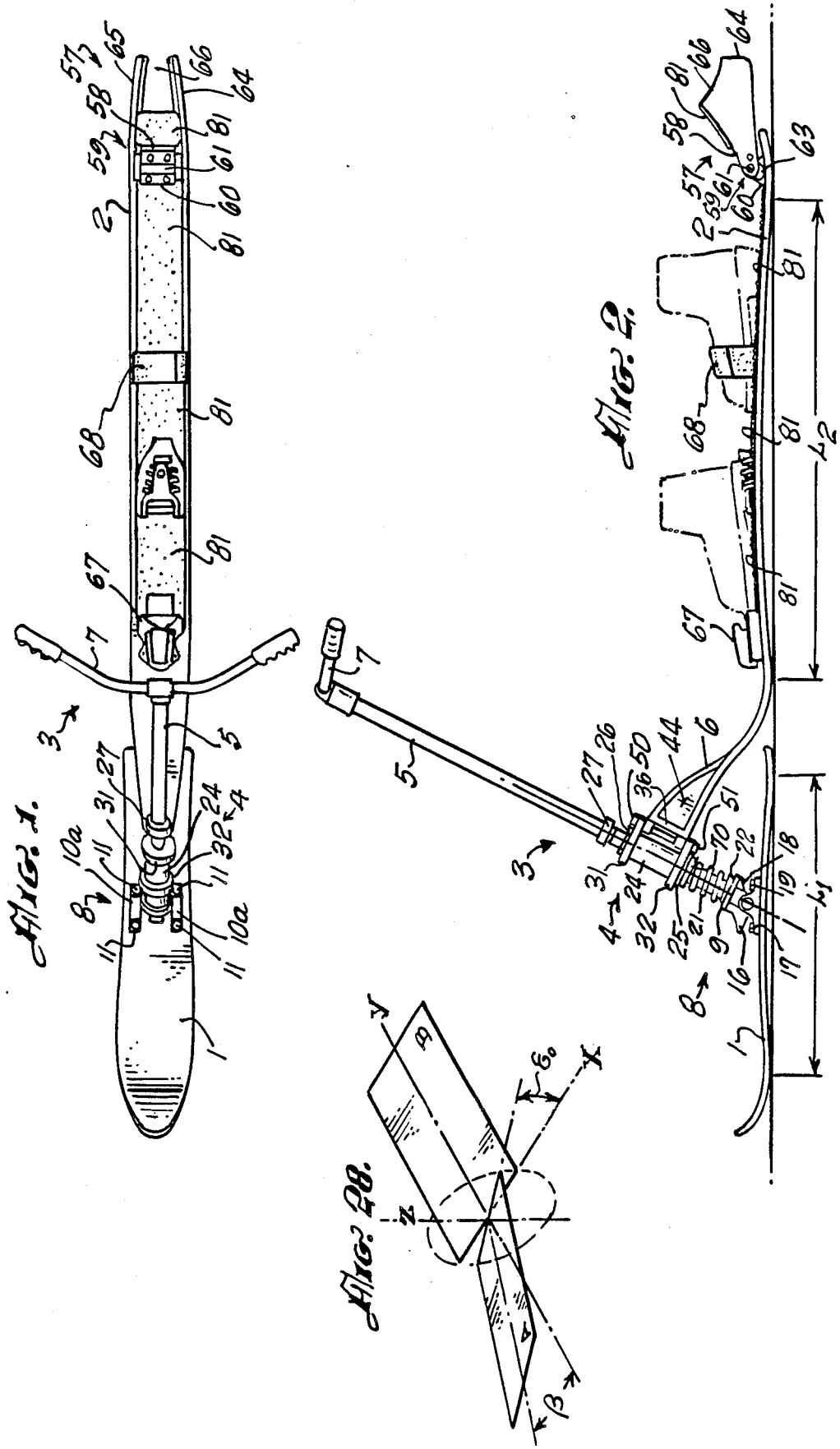

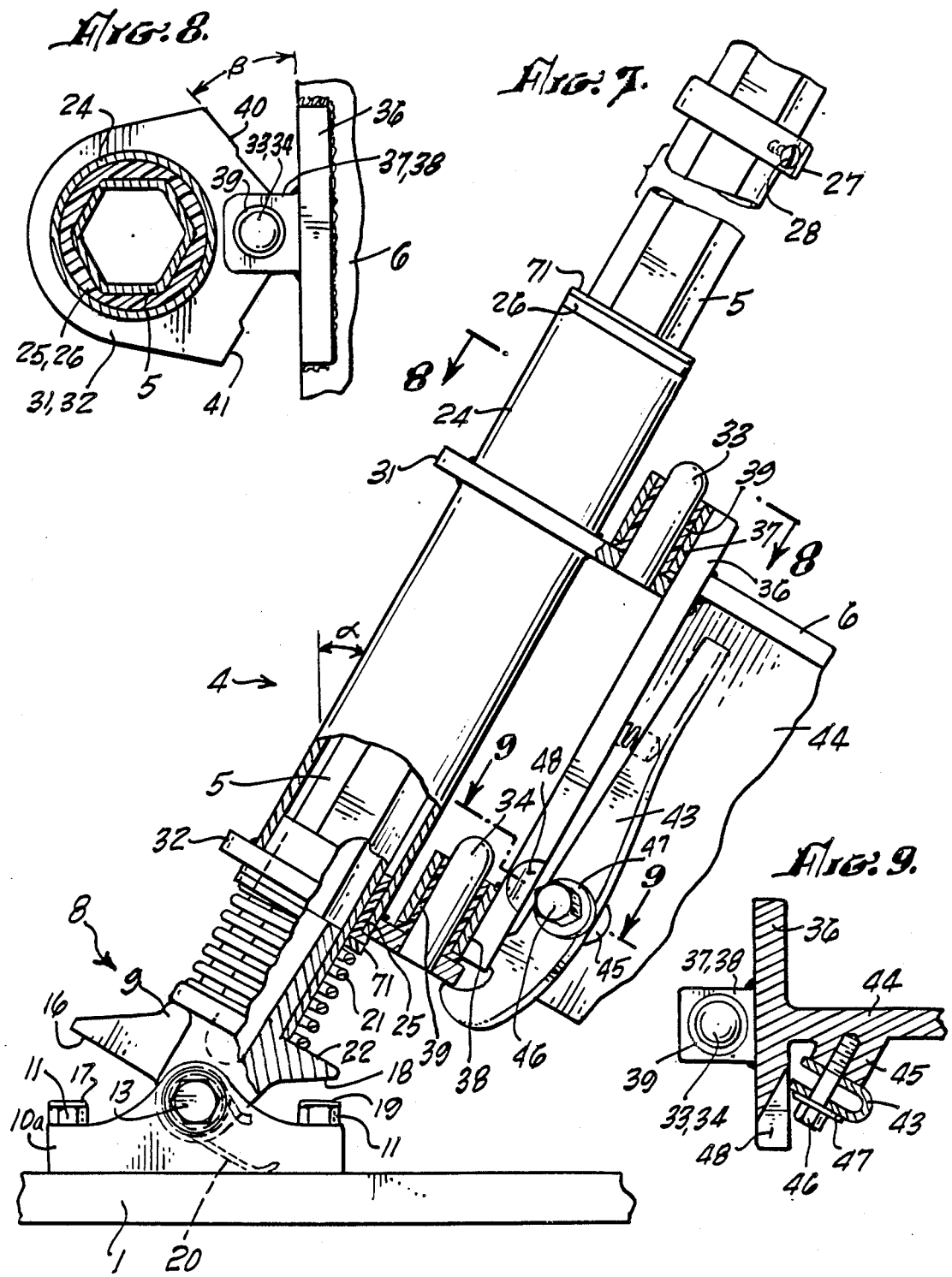

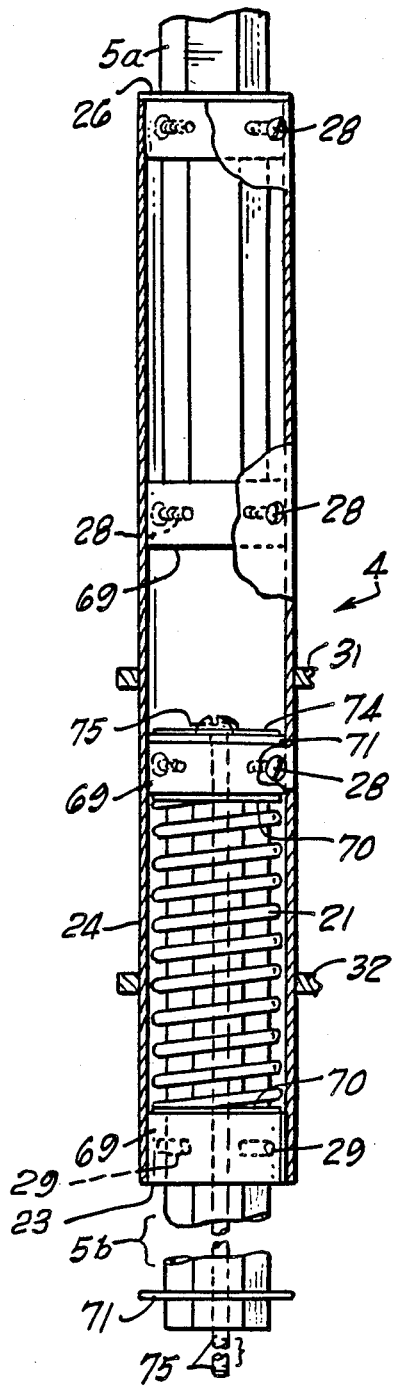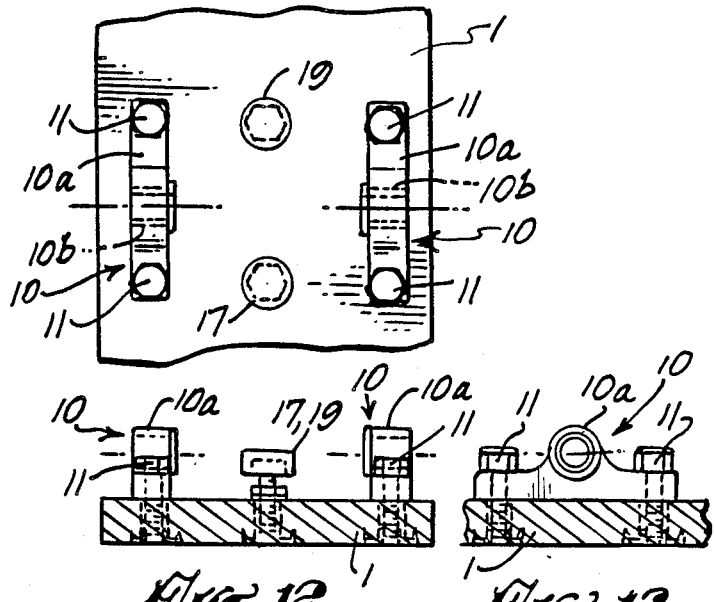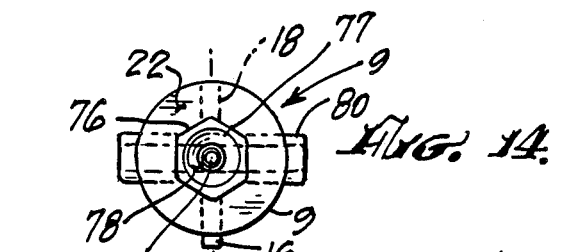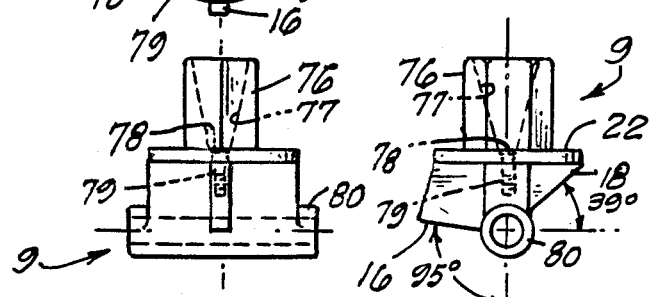

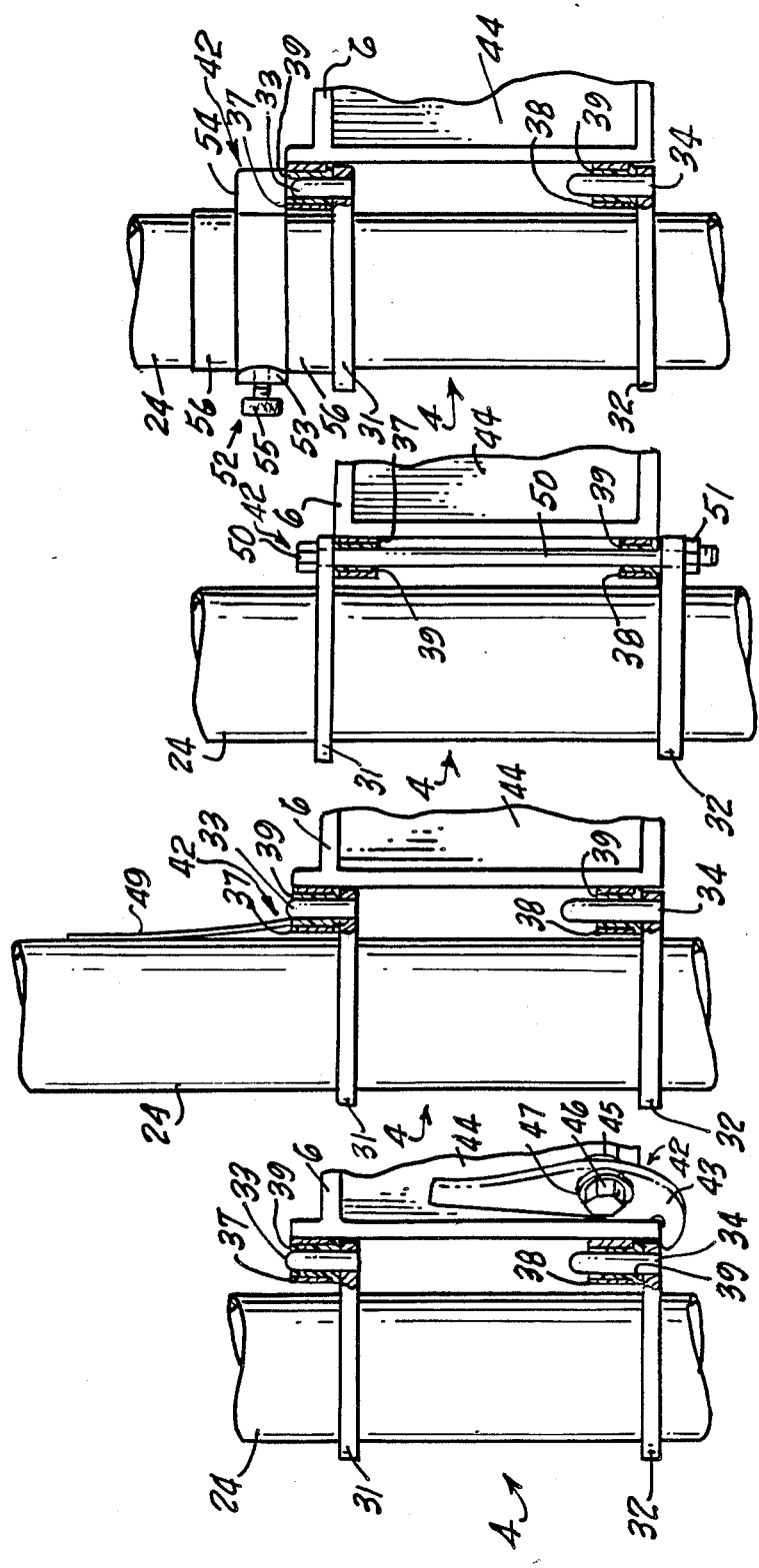

ARTICULATED SKI

SUMMARY OF THE INVENTION

The articulated ski of this invention consists of:
a relatively short, steerable first ski in front,
a rearwardly inclined steering shaft with handlebars on top hingedly attached at the bottom to approximately the middle of the first ski,
a relatively long second ski with tip upswept high,
disengageable pivot pin means rotatably coupling the second ski to the steering shaft about a rotational axis,
a compression spring interposed coaxially of the steering shaft between the pivot pin means and the hinged attachment of the steering shaft to the first ski,
a pair of tandem, spaced, toe cups mounted on top of the second ski,
a brake hingedly attached to the tail of the second ski and
a corrugated rubber-like adhesive mat covering the top of the second ski from the front toe cup rearward past the second toe cup to the tail, then resuming over the top of the brake.

The skier normally rides with feet in tandem in the toe cups on the second ski and with hands on the handlebars. The technique is to shift most of one's weight to the front foot, so as to be ready at any moment to disengage the rear foot to apply the brake, or to swing it out to the left or right for balance, or to push off at start. Turns are made using a combination of steering and tilting (banking) into the curve. The steering angle is small at higher speeds and large at slow speeds, particularly at start, as on a bicycle. Ski poles are not used. In the event of a spill on a slope with or without separation from the skier, the articulated ski will fall on its side, the handlebar imbedding in the snow to function as an automatic safety brake and anchor.

BACKGROUND OF THE INVENTION

The only instance known to me of a currently marketed snow ski, where the rider stands with both feet on the same ski is the MONOSKI manufactured by Rossignol of France. As compared with the herein disclosed second ski, the MONOSKI is much longer and wider, with a pronounced taper toward the tail. Its two ski binders are mounted for feet disposed side by side and toes directed forward toward the tip of the ski, not heel to toe in tandem as disclosed herein. The MONOSKI is a single ski as the name implies, hence it is not an articulated ski herein defined as two interacting skis: a first ski adapted exclusively for steering and a second ski adapted exclusively for transporting the skier.

The SKIBOB by Authier of Switzerland represents the closest prior art combination of elements of the present invention, to the best of my knowledge. It is no longer being produced. It was adapted, however, for seated skiing with no provision of space for the feet. Instead, it was provided with an elongated seat on top of a trapezoidal frame, which occupied most of the top surface of the second ski. The skier rode with feet airborne or gliding over the snow for balance. A pair of very short skis was offered as an optional accessory, one for each foot, thereby placing a skier on four skis simultaneously. No seat belt was provided, hence whenever the skier separated from the seat, as on a mogul, the ski was, for the duration of the separation, out of his control, and the skier was in danger of an injurious landing. The ski lift operators, at least those in the western states, have been required by their insurance companies to ban the SKIBOB from their properties, quite likely on account of the safety hazard.

In the stand up articulated ski disclosed herein, the skier rides standing, with knees slightly bent and thus capable of absorbing much more of the shock of rough terrain than a skier seated on a SKIBOB. With this cushioning effect both skis will follow the roughness of the terrain more intimately and will be momentarily airborne less of the time. This means that the skier will have better control. Secondly, by spring-biasing the first ski to reach 1.5 inches down below the nominal level of the second ski, the herein disclosed first ski will reach into holes up to 1.5 inches deep and still maintain contact with the terrain and hence maintain better control. The SKIBOB provides no spring biasing.

It is inconceivable that a skier would deliberately jump to get airborne while seated on a SKIBOB, first because he separates from the seat and will cettainly misalign in flight and will spill on impact with the terrain and, secondly because the front ski of the SKIBOB is rubber band biased to nose down while airborne so as to impact the snow nose end first like a spear thrown. On the other hand, the herein disclosed first ski is radial spring biased to nose up, so as to impact the snow tail end first. Also the front foot is secured to the ski at all times, so that airborne jumps and turns can safely be executed with the articulated ski disclosed herein.

Cooperating maximum nose up angle stop-arm and-boss, respectively, and minimum nose down angle stop-arm and-boss, respectively, are provided in the herein disclosed articualted ski. Equivalent functioning stops are also provided in the SKIBOB but they are of different mechanical design and besides, the actual values of the stop angles are significantly different.

Right and left steering angle stop arms are provided on the herein disclosed pivot pin plates to limit the maximum range of the steering angle to $\beta = \pm 45°$, right and left, respectively, from front center. No corresponding stops are provided in the SKIBOB where the front ski steers unrestrictedly over a range of $\beta = \pm 90°$.

Brake means are hingedly attached to the tail of the herein described second ski. The brake is spring-biased to be normally raised out of contact with the snow except when depressed by the skier's foot. No brake is provided on the SKIBOB A corrugated, adhesive, rubber-like mat is applied over the top surface of the herein described second ski, commencing with the front toe cup and extending rearward to the tail, then resuming over the top of the brake, whereby an anti-slip covering is provided. The SKIBOB provides no anti slip covering, indeed, no accessible space for the feet of the skier.

PRESENTATION OF THE DRAWINGS

In the drawings:
FIG. 1 is a plan view of the first embodiment of the herein disclosed articulated ski;
FIG. 2 is a front elevation of FIG. 1;
FIG. 3 is a front elevation, partially in section, of the second embodiment of the case tube with
pivot pin plates broken away;
FIG. 4 is a front view of a flanged linear reciprocating bearing and stop collar with hexagonal hole and diametric roller pin holes;
FIG. 5 is a bottom plan view of FIG. 4 and, without the outermost circle, it is a top plan view of FIG. 6;

FIG. 7 is a front elevation, partially in section, of the first embodiment of pivot pin means, coupling the steering shaft to the bearing fixture, partially broken away, and showing the first hinge means coupling the steering shaft to the first ski, partially broken away;

FIG. 8 is a top plan view of FIG. 7 taken through section 8—8;

FIG. 9 is a top plan view of FIG. 7 taken through section 9—9;

FIG. 10 is a front elevation, partially in section, of the third embodiment of the case tube with pivot pin plates broken away;

FIG. 11 is a plan view of the spider cradle assembly mounted on ski 1 shown partially broken away;

FIG. 12 is a front elevation of FIG. 11;

FIG. 13 is a side elevation of FIG. 11;

FIG. 14 is a top plan view of the spider;

FIG. 15 is a front elevation of FIG. 14;

FIG. 16 is a side elevation of FIG. 14;

FIG. 17 is a front elevation of the pivot pin means partially broken away coupled to the bearing fixture, partially broken away, showing the snap hook embodiment of the secure keeper means;

FIG. 18 is a front elevation of the pivot pin means partially broken away coupled to the bearing fixture, partially broken away, showing the reed spring embodiment of the secure keeper means;

FIG. 19 is a front elevation of the pivot pin means partially broken away coupled to the bearing fixture, partially broken away, showing the nut and bolt embodiment of the secure keeper means;

FIG. 20 is a front elevation of the pivot pin means partially broken away coupled to the bearing fixture, partially broken away, showing the rotary arm embodiment of the secure keeper means;

FIG. 28 is a schematic view in perspective of the effective planes of the first and second skis with their center lines oriented in a $\beta = 30°$ right turn, to show the resulting edging angle $\beta = 15°$.

DETAILED DESCRIPTION

Figure 3:
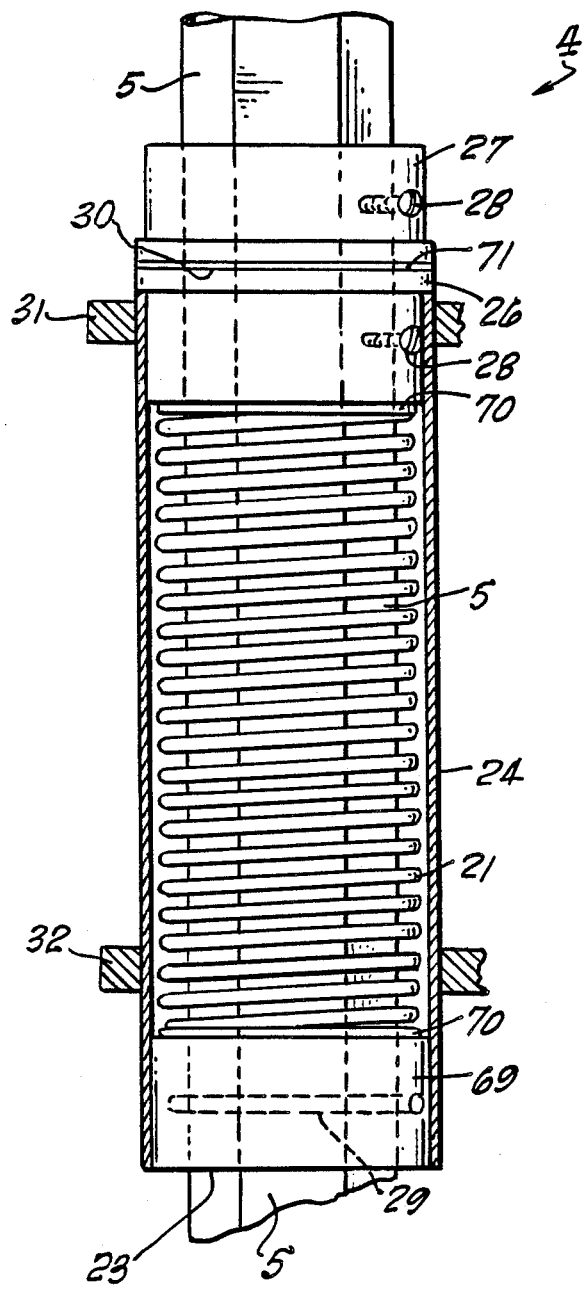

In the drawings, the articulated ski of this invention, generally indicated as 3 in FIGS. 1 and 2, consists of a relatively short, steerable ski 1 in front, linked to a relatively long ski 2 in the rear by pivot pin means, generally indicated as 4 coaxially mounted on steering shaft 5, and by bearing fixture 6 affixed to the modified tip of ski 2. The upper end of steering shaft 5 is provided with conventional handlebars 7. The lower end of steering shaft 5 hingedly engages ski 1 proximal its midpoint via first hinge means 8, the upper wing 9 of which is a Tee-branched spider affixed to the steering shaft, and the lower wing 10 of which is a spider cradle consisting of a pair of pillow block bearings 10a each one of which is bolted to the top of ski 1 with two screws 11 each screw 11 being secured to ski 1 by its engagement with a cooperating Tee nut 12 in the bottom of ski 1. Each pillow block bearing 10a is lined with a Teflon filled acetal flanged bushing 10b. A bolt 13 in combination with a pair of washers 14 and self-locking nut 15 functions as the hinge pin of first hinge means 8. First hinge means 8 provides wrist pin articulation around the horizontal axis of bolt 13 for the orientation of the longitudinal axis of ski 1 upward at a nose up angle = $v_u$, or downward at a nose down angle = $v_d$ degrees.

The angle of nose up is limited to a maximum value $v_{u\ max}$ = about 25° by means of nose up stop arm 16 provided on spider 9 forwardly of bolt 13 of first hinge means 8. Nose up stop arm 16 is adapted to engage the rubber-covered top face of nose-up stop bolt 17 which is adjustably secured to the top of ski 1 by means of a lock nut 17a and a washer 17b on top of-and Tee nut 17c in the bottom of-ski 1. This combination of 16, 17, 17a, 17b and 17c is hereinafter referred to as nose up angle, $v_{u\ max}$, stop means.

The angle of nose down is limited to a minumum value $v_{d\ min}$ = about −9° by means of nose down stop arm 18 provided on spider 9 rearwardly of bolt 13 of first hinge means 8. Nose down stop arm 18 is adapted to engage the rubber-covered top face of nose-down stop bolt 19 which is adjustably secured to the top of ski 1 by means of a lock nut 19a and a washer 19b on top of-and Tee nut 19c in the bottom of-ski 1. This combination of 18, 19, 19a, 19b and 19c or any mechanical equivalent thereof is hereinafter referred to as nose down angle, $v_{d\ min}$, stop means.

Radial nose-up spring 20 embracing bolt 13 is provided to engage pillow block bearing 10 and the top of ski 1, whereby ski 1 is urged to nose up to $v_{u\ max}$ = about 25° whenever ski 1 is airborne. Upon resumption of contact with the terrain, airborne ski 1, accordingly, will touch down tail end first. An alternative option to radial nose-up spring 20 is to provide proximally the bolt 13, in combination: a pair of hooks (not shown), the first hook on ski 1 forwardly of bolt 13 and directed forwardly, the second hook on the front of steering shaft 5 and directed upwardly, with a rubber band or equivalent elastic member stretched therebetween. These alternative options and their mechanical equivalents are hereinafter referred to as second biasing means.

Compression spring 21, hereinafter referred to as first biasing means, is provided coaxially of steering shaft 5. It is compressed between shoulder face 22 of spider 9 and bottom face 23 of lower reciprocating bearing 69, where it is adapted to cushion and reduce the recoil amplitude of reciprocation of steering shaft 5 in its transmission to case tube 24 and thence to ski 2. Compression spring 21 is selected to have the following characteristics: Elastic deformation under 100% of maximum force in compression of about 75 to 100 lbs. (34–45.5 kg)=about 2 inches (51 mm).

Figure 4:
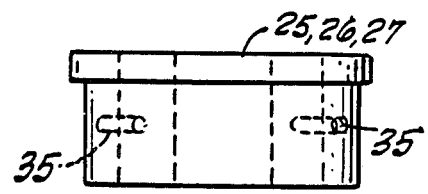
Figure 5:
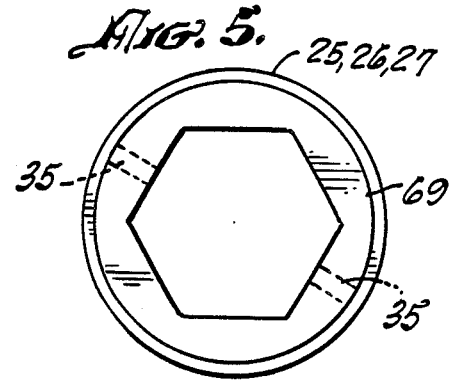
Figure 6:
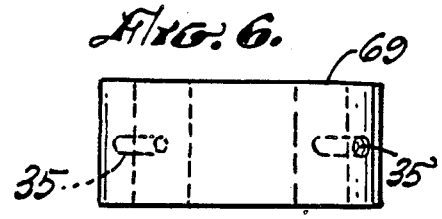
FIG. 6 is a front elevation of a piston with hexaagonal hole and diametric roller pin holes.
Figure 23:
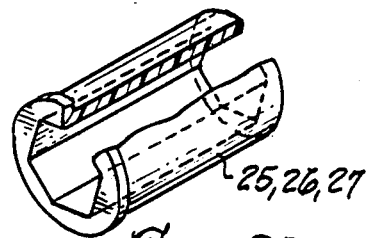
FIG. 23 is a view in perspective, partially broken away for easier visualization, of FIG. 4, diametric roller pin holes omitted.
Figure 24:
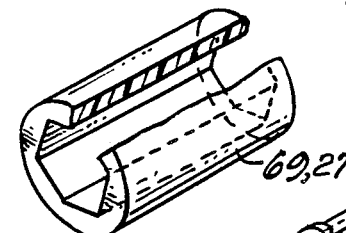
FIG. 24 is a view in perspective, partially broken away for easier visualization, of FIG. 6 diametric roller pin holes omitted.

Pivot pin means 4 is seen in the first and simplest case tube 24 embodiment of the invention in FIGS. 1, 2 and 7, where the spring 21 is shown as being exposed to the weather. However, the spring can be enclosed within a rubber accordion boot (not shown) secured at its top to the bottom of case tube 24, as by a hose clamp. In this case tube embodiment, pivot pin means 4 consists of a combination of: a case tube 24 about 2 inches (51 mm) I.D. and at least about 4 inches (102 mm) long and provided with flanged lower- and upper- linear reciprocation bearings 25, 26, respectively, secured with a pair of diametrically opposed set screws 28, not shown, to the upper and lower ends of case tube 24. These bearings provide the desired combination of free linear reciprocation with no rotation. The simplest form of these bearings consists of Teflon filled acetal bushings with hexagonal, square, or other polygonal holes, preferably hexagonal holes as in standard Teflon filled acetal linear bearings offered by Boston Gear and illustrated in FIGS. 4, 5 and 23. Accordingly, the steering shaft 5 must likewise be polygonal in cross-section, at least the portion that reciprocates within the linear reciprocation bearings 25, 26. An equivalent optional alternative would be a spaced pair of linear ball bearings (not shown), such as the "patented BALL BUSHING for anti-friction linear motion" offered by Thomson Industries, Inc., of Manhattan, N.Y.

A stop collar 27, seen in FIGS. 4, 5, 6, 23, 24, 25 or 26, is affixed to steering shaft 5 bymeans of a pair of diametrically opposed set screws 28 as seen in FIG. 3, or by means of a pair of short roller pins 29 as seen in piston 69 at the bottom of FIG. 10. Stop collar 27 is adapted to engage the top face 30 of flanged upper linear reciprocating bearing 26 under conditions of zero force in compression of spring 21 as occurs when ski 1 is airborne. A rubber washer 71 with hexagonal hole may be interposed between stop collar 27 and top face 30 to reduce the noise of their impact.

Upper- and lower- pivot pin plates 31, 32 are spacedly affixed to the exterior of case tube 24. Upwardly directed upper- and lower- pivot pin, 33, 34, respectively, is affixed each to its corresponding plate in alignment with a rotational bearing axis oriented parallel to and rearwardly displaced about 1.5 inches (38 mm) from the longitudinal axis of steering shaft 5. This provides steering with a negative caster of about 1.5 inches. Thus steering shaft 5 does not rotate about its own axis, but sweeps a circular arc centered about the rotational bearing axis. This negative caster is not essential per se to the workability of the invention. Its justification arises primarily in the convenience of the reliable, sturdy coupling of pivot pin means 4 to bearing fixture 6 and its quick disconnect feature. This allows separation of the articualted ski into 2 elongated elements that can be tied together into a compact package for convenient storage or handling on the ski lift. In the original concept (not shown) the steering shaft rotated on its own central axis providing no caster. In that case the steering shaft was hinge- articualted above bearing fixture 6 for folding down into a compact package. This had the disadvantage of mechanically weakening the steering shaft in flexion.

Although the tip of ski 1 is conventional, the tip of ski 2 differs in that itsweeps upward higher in order to provide clearance for the tail end of ski 1 at its minimum nose-down angle, $v_{d\ min} = -9°$. The tip of ski 2 is sandwiched between bearing fixture 6 below it and a steel plate above it (not shown) and it is tightly secured therebetween by one or more screws, not shown. As best seen in FIG. 2, bearing fixture 6 is generally shaped like a triangular frame with 2 relatively long sides which arch concavely downward and a relatively short straight third side 36 directed forwardly. This triangle may be an open frame, but preferably it is provided with an internal stiffening rib or web 44 for added strength.

Figure 27:
FIG. 27 is a view in perspective, partially broken away for easier visualization, of the flanged bushing.
Figure 25:
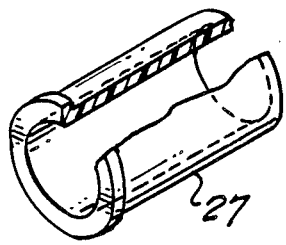
FIG. 25 is a view in perspective, partially broken away for easier visualization, of the round hole embodiment of FIG. 23.
Figure 26:
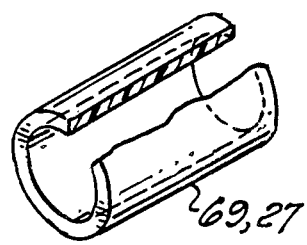
FIG. 26 is a view in perspective, partially broken away for easier visualization, of the round hole embodiment of FIG. 24.

The configuration of bearing fixture 6, after its installation on the tip of ski 2, is adapted to maintain short straight side 36, hence the rotational bearing axis, sloped backwardly from vertical by an angle $\alpha = 10°$ to $40°$, preferably about $30°$. Projecting perpendicularly forwardly from short straight side 36 is a pair of pivot pin mounting bosses 37, 38 which are spaced apart the same distance as are upper- and lower- pivot pin plates 31 and 32, respectively. These bosses 37, 38 are each provided with a hole bored in coaxial alignment with the aforementioned rotational bearing axis, each said hole being provided with a Teflon filled acetal flanged bushing 39 of the type seen in FIG. 27. Upper- and lower- pivot pins 33, 34 are preferably of slightly differing lengths and are adapted to engage their corresponding flanged bushings 39. Their unequal lengths conveniently facilitate the engagement of the pivot pins in their respective bushings and it makes no consequential difference as to which of the two pins is the longer.

The inadvertent uncoupling of pivot pins 33, 34 from their respective flanged bushings 39, as under airborne conditions, is prevented by providing secure keeper means, generally indicated as 42. Four different optional secure keeper embodiments are shown in FIGS. 17, 18, 19 and 20.

A spring-loaded snap hook 43 secure keeper embodiment is seen in FIGS. 7, 9 and 17. The snap hook 43 requires to operate in a plane that is radial to the rotational bearing axis while web stiffener 44 of bearing fixture 6 interferes by occupying the radial plane that is in direct longitudinal alignment with the rotational bearing axis. Therefore, I arbitrarily elected to radially index the plane of the snap hook 43 clockwise, using a $30°$ wedge boss 45 as shown. Spatial considerations for tool accessibility to service snap hook screw 46 and washer 47 required the provision of cut-out 48 in short straight side 36.

The second embodiment of secure keeper means 42 is the reed spring 49 shown in FIG. 18. The reed spring was also used in the prior art *SKIBOB* offered by Authier.

The third and simplest embodiment of secure keeper means 42 is the first pivot bolt 50 and nut 51 embodiment shown in FIGS. 2 and 19.

Although any one of the preceding three case tube embodiments is workable, I prefer the fourth embodiment of secure keeper means 42 shown in FIG. 20. In this embodiment, an integrated combination, generally indicated as 52, of rotary sleeve 53, secure keeper arm 54 and knurled set screw 55 is sandwiched between two spacer sleeves 56 of which rotary sleeve 53, and spacer sleeves 56 surround case tube 24. The spacer sleeves 56 are affixed to case tube 24 while the integrated combination 52 is adapted to freely rotate externally of case tube 24 until secured thereto by knurled set screw 55. The coupling of pivot pins 33 and 34 in pivot pin bosses 37 and 38 is secured by indexing rotary sleeve 53 into engagement of its secure keeper arm 54 with the top face of upper pivot pin boss 37 and thereat tightening knurled set screw 55.

As shown in FIG. 8, pivot pin plate 31 and/or 32 is provided with right- and left-steering angle stop arms 40, 41, respectively, which are adapted to engage the front face of short straight side 36, thereby limiting steering angle $\beta$ to the range of $\beta = \pm 45°$ to the right and to the left of front center, respectively.

The geometry of the completely assembled articulated ski is adapted to provide at nose-up angle $v_u = 0°$ and:

(a) under zero load in compression of compression spring 21, that is, under airborne conditions, the effective level of ski 1 at about 1.5 inches (38 mm) below the effective level of ski 2;

(b) under 100% of maximum load, about 65 to 75 lbs. (29.5 to 34 kg) in compression of compression spring 21, the effective level of ski 1 at about 0.5 inch (13 mm) above the effective level of ski 2; and (c) under 75% of maximum load, about 49 to 56 lbs. (22.3 to 25.5 kg) in compression of compression spring 21, the effective level of ski 1 same as the effective level of ski 2.

Ski 1 and ski 2 each has a tip, followed in succession by a shovel, a waist and a tail. The tip of ski 1 is conventinal but the tip of ski 2 is upswept higher as above described. Both skis have widths at the shovel=about 140 mm, at the waist=about 114 mm, at the tail=about 127 mm. As seen in exaggerated degree in FIG. 2, both skis are concavely arched downward in the waist section and upward in the tip and tail sections. The distance between the points of tangency of a tangent common to the shovel and the tail sections of a ski is designated hereinafter, for purposes of this disclosure, as the "track length" of that ski and symbolically as $L_1$ and $L_2$ of the first and the second ski, respectively. I have found, for example, that an experienced amateur male skier, about 5 feet 11 inches tall and weighing about 180 lbs. can perform quite well on the articualted ski of this invention measuring $L_1$=about 27 inches (686 mm) and $L_2$=about 42 inches (1067 mm). The ski width measurements for ski 1 are about the same as for ski 2, namely: shovel width =about 5.5 inches (140 mm), waist width=about 4.5 inches (114 mm), and tail width=-about 5 inches (127 mm). The height of the handlebars is preferably about 36 to 38 inches above floor level. These dimensions may be scaled down for small individuals. World class competition skiers may find it desirable to deviate from these specifications by customizing to maximize their performance for special events. A track length ratio of $L_1/L_2$=from about 0.6 to about 0.7 should meet the requirements of most skiers, preferably $L_1/L_2$=about 0.64.

A brake extension body 57 is an extension of rear wing 58 of second hinge means generally indicated as 59 which, in turn, is affixed at front wing 60 to the tail of ski 2. A bolt 61 in combination with its self-locking nut 62 serves as the hinge pin of second hinge means 59. Third spring biasing means 63 is a radial spring which embraces bolt 61 and, engaging brake extension body 57 at its upper end and the top surface of ski 2 at its lower end, it urges brake extension body 57 upward and out of contact with the snow pack. The brake extension body, which is normally raised out of contact with the snow, can be engaged with the snow for braking, at skier's option, by foot pressure.

Depending from the length of the left and right edges of brake extension body 57 are vertical walls 64, 65 which, for their terminal three inches, converge rearwardly to form a constricted outlet 66 at the trailing end of the brake extension body, whereby the snow that is captured within the brake extension body is compressed and discharged through the outlet during braking.

A front toe cup 67 is affixed to the top surface of ski 2 at a location set back slightly from the front end of the effective track length of ski 2 followed by a rear toe cup 68 about 15 inches (381 mm) therebehind whereby to accommodate the front and rear feet heel to toe, respectively, of the skier. Toe cups 67, 68 may consist of a strap loop, preferably one that is adjustable to the foot, for example, a strap with its free ends provided with hook and loop fasteners, commonly marketed as Velcro fasteners.

With this type of toe cup the skier can disengage either foot easily. However, the skier carries most, if not all, of his weight on his front foot which he does not disengage from the front toe cup 67 for the duration of a ski run. The skier disengages his rear foot from toe cup 67 as necessary to push off or to swing out to the left or right for balance. By reason of safety considerations under airborne ski 2 conditions, where the skier needs absolute confidence in the attachment of at least his front foot to ski 2, a conventional ski binding is provided as front toe cup 67 in the preferred embodiment of the invention.

The top surface of ski 2, may be covered with an adherent, corrugated, rubber-like mat 81, commencing at first toe cup 67 and extending rearward to the tail of ski 2, then resuming again over the top surface of brake 57, whereby a non-slip surface is provided for improved safety.

The first embodiment of the case tube 24, in which the compression spring 21 is exposed, has already been described. It is depicted in FIG. 2 with ski 1 and ski 2 flat on the floor at the same level. This illustrates the situation where compression spring 21 is loaded in compression to 75% (65-75 lbs) of its maximum load (88-100 lbs). Hence the gap between the bottom face of stop collar 27 and the top face of flanged upper linear reciprocating bearing 26 =about 1.5 inches and only about 0.5 inch of the 2 inch compressibility stroke remains before the spring bottoms out. FIG. 7 depicts the same case tube embodiment at about the same degree of compression.

FIG. 3 shows a second embodiment of the case tube 24 in which the compression spring 21 is enclosed within case tube 24. The situation illustrated here is with compression spring 21 under zero compression load. In this embodiment a flanged upper linear reciprocating bearing 26 with hexagonal hole slidingly engages hexagonal steering shaft 5. Bearing 26 is secured to the top end of case tube 24 by means of a pair of diametrically opposed set screws 28. A piston 69 with hexagonal hole is secured to hexagonal steering shaft 5 by means of roller pin 29 and slidingly engages the interior surface of case tube 24. Compression spring 21, with intermediate washer 70 at each end, is compressed between the bottom face of bearing 26 and the top face of piston 69.

As illustrated in FIG. 3, the piston 69, being at the bottom of its stroke, is flush with the bottom end of case tube 24, whereat the bottom face of stop collar 27 engages the top face of bearing 26. Stop collar 27 is affixed to steering shaft 5 either by a pair of diametrically opposed set screws 28 or by a roller pin 29 (not shown). The steering shaft 5 extends 2 inches beyond the bottom face of piston 69 where it terminates in abutting contact with shoulder face 22 of spider 9. Under maximum load in compression, piston 69 with steering shaft 5 rises 2 inches inside case tube 24 compressing spring 21 to its limit, whereupon shoulder face 22 engages the bottom end of case tube 24. The noise of striking the case tube by stop collar 27 on top or by shoulder face 22 on the bottom is muted by interposing elastic rubber washer 71 with hexagonal hole.

Figure 21:
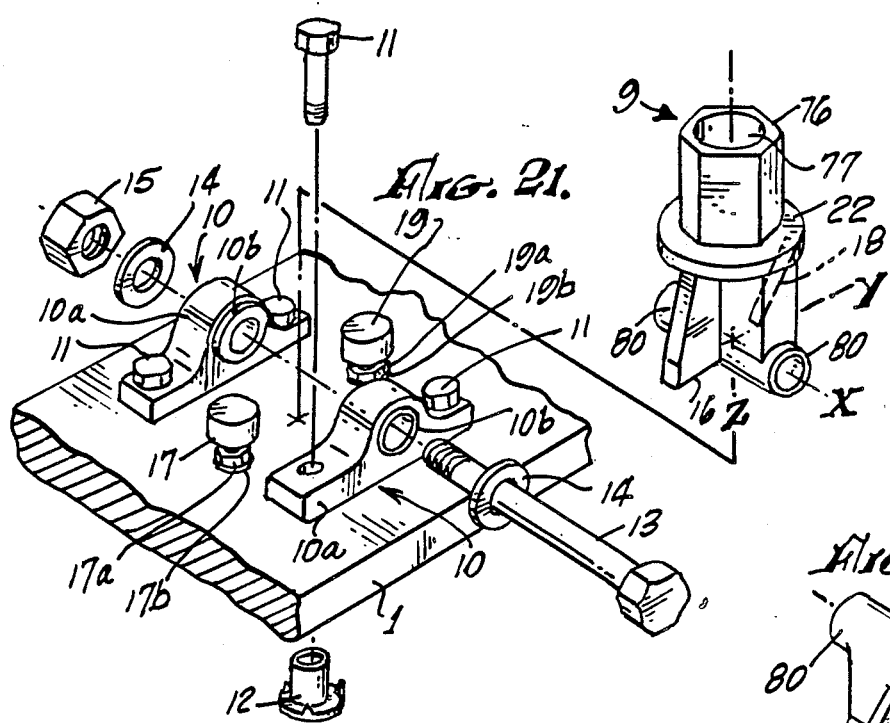
FIG. 21 is a view in perspective of FIG. 11 in combination with FIG. 14, showing certain parts exploded for easier visualization.
Figure 22:
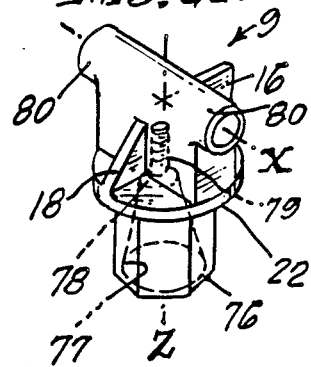
FIG. 22 is an inverted view in perspective of the spider of FIG. 21.

The Tee-branched spider 9 is appropriate for all embodiments of case tube 24. It is shown in orthogonal projection in FIGS. 14, 15 and 16, and in perspective in FIGS. 21 (upright) and 22 (inverted). The hexagonal prism tower 76 on top is adapted to press fit into the bottom end of steering shaft 5 which, preferably, is constructed of heavy wall hexagonal aluminum tubing. The hexagonal prism tower has a conical cavity 77 with flat bottom 78. The use of light aluminum tubing for steering shaft 5 and the maximum size of the cavity helps to reduce the overall unsprung weight of the ski 1 - steering shaft 5 combination thereby reducing the momentum of the vibrations of ski 1 that are transmitted through spring 21 to ski 2.

The tower 76 rises from the shoulder face 22 of spider 9. Depending from the shoulder symmetrically about the XZ plane is Tee-branch boss 80 which is provided with horizontal bore hole 81, adapted to receive bolt 13 of first hinge means 8, whereby steering shaft 5 is hingedly coupled to ski 1.

Nose-up stop arm 16 depends from shoulder 22 symmetrically about the YZ plane and forwardly of the XZ plane. Nose-down stop arm 18 depends from shoulder 22 symmetrically about the YZ plane and rearwardly of the XZ plane.

In a third and preferred embodiment of the case tube 24, the case tube is extended upward as shown in FIG. 10. The steering shaft consists of an upper segment 72 that is comparatively long and lower segment 73 that is comparatively short and is coaxially spaced a distance $\Delta$ from 72, where $\Delta \geq 2.25$ inches, under zero load conditions on compression spring 21 and $\Delta \geq 0.25$ inch under maximum load in compression. The upper segment 72 of thick walled aluminum tubing may be circular or hexagonal in cross-section, inasmuch as this can be accommodated either way with equal facility. The upper segment terminates at least 4 inches deep inside case tube 24. Segment 72, at its bottom end, is coaxially secured to case tube 24, including interposed piston 69 by means of a pair of diametrically opposed set screws 28. A flanged upper linear reciprocating bearing 26, press fitted into the upper end of case tube 24, is affixed to upper segment 72 as well as to case tube 24 by means of a pair of diametrically opposed set screws 28. Piston 69 and bearing 26 are provided with a hole that is circular or hexagonal conforming to the cross-section of upper segment 72. Accordingly, in this case tube embodiment case tube 24 is rigidly attached to upper segment 72 to function therewith as an integral unit.

Lower segment 73 consists of a length of heavy walled aluminum tubing of polygonal, preferably hexagonal, cross-section. The provisions for and operation of segment 73 in the lower section of case tube 24 are exactly the same as has been described above for steering shaft 5 of the second case tube embodiment. The exception is that lower segment 73 of the present, preferred embodiment terminates within case tube 24, where its upper end is capped by washer 74. Washer 74 serves the same function as stop collar 27 of the preceding case tube embodiments. Long screw 75 extends coaxially through washer 74 and continues through the entire length of segment 73. There it engages the threaded hole 79 provided in the flat bottom 78 of the conical cavity 77 of the hexagonal tower 76, thereby simultaneously securing washer 74 to the top end and spider 9 to the bottom end of segment 73. Rubber washer 71 with hexagonal hole may be interposed between washer 74 and linear reciprocating bearing 26 thereby to mute the sound of their collisions as in the first and second case tube embodiments.

In this case tube embodiment the vibrations of ski 1 are transmitted via segment 73 and first biasing means 21 in reduced recoil amplitude to case tube 24, whereby the recoil vibrations sensed by the skier's hands on handlebars 7 and by his feet on ski 2 as well are substantially reduced by absorption in the spring 21. This is the preferred case tube embodiment because it provides the smoothest ride characteristics. This is attributed to the large reduction of unsprung weight that results from separating steering shaft 5 into long upper segment 72 and short segment 73, where the upper segment is sprung weight for which the axiom: "the heavier the better" applies and where the lower segment is unsprung weight for which the axiom: "the lighter the better" applies.

As is depicted in FIG. 28, the plane A of the bottom of ski 1 forms a dihedral angle $\epsilon_o$, with the corresponding horizontal plane B of ski 2. The actual value of $\epsilon_o$, depends on two other angles: $\alpha$ and $\beta$, where $\alpha$ is the backward angle of inclination from vertical of the rotational bearing axis, and $\beta$ is the steering angle, positive for right turn from front center, negative for left.

Depicted in FIG. 28 is the edging angle, $\epsilon_o$, of ski 1 for the special case where the ski 2 has an edging angle=zero degrees, that is, ski 2 is flat on the floor.

The skier naturally leans or banks into a turn or slope on ski 2 for balance by an angle of $\lambda$ degrees from the terrain so he must have control of the edging angle $\epsilon$ of ski 1 at all times. Ski 1, at the same time, would appear to address the terrain at a resultant edging angle of $\epsilon = (\epsilon_o + \lambda)$, but that is an oversimplification which holds only for small values of $\beta$ or $\lambda$. The actual relationship is complex. I have developed the following rigorous general equation for the edging angle $\epsilon$ of ski 1:

$$\epsilon = \sin^{-1}(\sin \lambda \cos\beta + \cos \lambda \sin \beta \sin\alpha) \quad (1)$$

Unfortunately, equation (1) is too cumbersome for a skier to apply while participating in a ski run. I have therefore developed the following simple relationship which may be useful to the skier:

$$\epsilon = \beta/2 + \lambda \quad (2)$$

Equation (2) is based on the assumption that steering angle $\alpha = 30°$. Equation (2) tends to give high results. Within the field boundaries of the scope of this invention, however, namely $\beta = \pm 45°$ and $\lambda = \pm 45°$, the greatest discrepancy between equations (1) and (2) occurs at the extreme corners: $\lambda = \beta = \pm 45°$ where the error=18.9°. For $\beta = \leq [25]$ the discrepancy $\leq 5°$ and for $\beta = \leq [34]$ the discrepancy $\leq 10°$, over the full range of $\beta = \pm 45°$. This shows that the predicted $\epsilon$ is satisfactory, especially at cruising speeds, where the steering angle is held within the range of $\beta = \pm 5°$.

I have explored alternative mechanisms for precisely locking the edging angle $\epsilon_o$ to the steering angle $\beta$ in a fixed $\beta/\epsilon_o$ ratio, specifically, one based on a system of gears with cables or push rods, and another based on a system of cams and cam followers. The complications mount when one provides for $\epsilon_o$ to be unaffected by the nose -up and -down motion. This introduces small deviations from the expected values of $\epsilon_o$ almost as great as doing with the mechanisms. Besides, such devices add unsprung weight to the first ski, which is undesirable. When subsequently I discovered the above-mentioned constancy of the $\beta/\epsilon_o$ ratio to be inherent in the first hinge means disclosed herein, within the limited range of our interest, namely, $\alpha=10°–40°$, $\beta$ and $\lambda=\pm45°$, I realized that the elegant mechanism would be superfluous and elected to go the herein disclosed route without it.

I claim:

1. In an articulated snow ski comprising two skis in linear sequence, a first ski followed by a second ski, each of said two skis having in succession front to rear a tip, a shovel section, a nominally horizontal waist section, a tail, a nominally horizontal longitudinal axis, track lengths $L_1$ and $L_2$, respectively, said second ski having a modified upswept tip, said track length $L_2$ being adequate to support both feet of the skier in tandem on top of said second ski, said first ski being steerable by handlebars surmounting a steering shaft secured to said first ski, the improvement comprising (a) a steering pivot fixture affixed to said modified unswept tip of said second ski, said steering pivot fixture providing a spaced pair of pivot pin bosses in alignment with a rotational bearing axis, said rotational bearing axis being rearwardly inclined from vertical by an angle=$\alpha$;

(b) said steering shaft provided with a pivot pin assembly mounted to said steering shaft, said pivot pin assembly being adapted to engage said pair of pivot pin bosses in alignment with said rotational bearing axis at said angle $\alpha$ of inclination from vertical, the axis of alignment of said pivot pin assembly being rearwardly displaced about one and one half inches from the center line of said steering shaft;

(c) said pivot pin assembly comprising a pair of spaced pivot plates affixed to the exterior of a case tube coaxially secured to said steering shaft with one upwardly directed pivot pin affixed to each one of said pair of spaced pivot pin plates, each said pivot pin being adapted to engage a corresponding one of said spaced pair of pivot pin bosses, respectively;

(d) said spaced pivot pin plates and said steering pivot fixture in combination being provided with right and left steering angle stop arms adapted to restrict said steering angle $\beta$ within the range of $\beta=\pm45°$ clockwise and counter-clockwise, respectively, of front center;

(e) a first hinge assembly comprising a Tee-branched spider secured to said lower end of said steering shaft, a first horizontal hinge pin, and a pair of pillow block bearings secured to said first ski;

(f) said steering shaft consisting of separate, coaxial, rotationally locked, reciprocatively independent, upper and lower segments;

(g) said upper segment being provided with a pair of spaced stop collars secured at its lower end, each one of said pair of stop collars being likewise secured to the top portion of said case tube;

(h) said lower segment having a polygonal cross section, the upper portion of said lower segment reciprocatively engaging the corresponding polygonal hole of an upper linear reciprocation bearing, saud upper linear reciprocation bearing being secured to the intermediate lower portion of said case tube;

(i) a compression spring, coaxially surrounding said lower segment, being engaged under compression between the bottom face of said upper linear reciprocation bearing and the top face of a lower piston;

(j) said lower piston being secured to said lower segment at a distance of about 2 inches above a shoulder face on said Tee-branched spider, said lower piston being adapted to reciprocatively engage the lower portion of said case tube;

(k) a washer capping the upper end of said lower segment, said washer being adapted to overhang the periphery of said upper end of said lower segment, said washer being secured to said lower segment with an axial screw engaging with its threaded end a threaded hole in said Tee-branched spider, said washer being adapted to contact the top of said upper linear reciprocation bearing under zero compression load;

(l) the length of said lower segment being adapted to support said first ski under zero compression load at about 1.5 inches (38 mm) below the nominal level of said second ski;

(m) said shoulder face on said Tee-branched spider being adapted to bottom out against the bottom end of said case tube under excessive compression load;

(o) said first ski being secured, at a location proximal its midpoint, to said pair of pillow block bearings;

(p) a spiral coil spring adjacent said first horizontal hinge pin in said Tee-branched spider and said pair of pillow block bearings, urging said first ski to nose upward;

(q) a maximum nose-up angle, $v_{u\ max}$, stop boss on said Tee-branched spider cooperating with a nose-up stop bolt in said first ski adjacent to and forwardly of said first horizontal hinge pin;

(r) a minimum nose-down angle, $v_{d\ min}$, stop boss on said Tee-branched spider cooperating with a nose-down stop bolt in said first ski adjacent to and rearwardly of said first horizontal hinge pin;

whereby the maximum stroke of reciprocation is limited to about 2 inches (51 mm) and the bumps of the terrain encountered by said first ski are cushioned by said compression spring before reaching the handlebars and said second ski.

2. An articulated snow ski according to claim 1, wherein said lower segment of said steering shaft is thick-walled tubing of hexagonal cross section.

3. An articulated snow ski according to claim 1, wherein said first ski, under zero load and, with nose-up angle $v_u=0°$, assumes a nominal level about 1.5 inch (38 mm) below the nominal level of said second ski.

4. An articulated snow ski according to claim 3, wherein the length of said lower segment is adapted to bottom out said shoulder face of said Tee-branched spider against the bottom end of said case tube under a downthrust on said steering shaft of from about 88 to about 100 pounds (40–45.5 kg), in which bottomed out under excessive compression load condition said first ski assumes a nominal level about 0.5 inch (13 mm) above the nominal level of said second ski.

5. An articualted snow ski according to claim 4, wherein the value of said angle of inclination $\alpha$ of said steering shaft from vertical is selected from within the range of from about 10° to about 40°, whereby is established a corresponding ratio of steering angle, $\beta$, to edging angle, $\epsilon$, of $\beta/\epsilon=6.0$ to 1.6, respectively, which corresponding ratio $\beta/\epsilon$ remains practically constant throughout the steering range of $\beta = \pm 45°$ for each said selected value of $\alpha$.

6. An articulated snow ski according to claim 5, wherein the value of said angle of inclination $\alpha$ from vertical=about 30°, whereby the corresponding ratio of steering angle/edging angle: $\beta/\epsilon$=about 2.0 is established which ratio holds practically constant throughout the steering range of $62 = \pm 45°$ from front center.

7. An articulated snow ski according to claim 6, wherein said cooperating nose-up angle stop boss on said Tee-branched spider and said stop bolt, respectively, adjacent to and forwardly of said first horizontal hinge pin are adapted to limit the value of said nose-up angle to $v_{u\ max}$=about 25°.

8. An articulated snow ski according to claim 7, wherein said cooperating nose-down angle stop boss on said Tee-branched spider and said stop bolt, respectively, said first horizontal hinge pin are adapted to limit the value of said nose-down angle to $v_{d\ min}$=about $-9°$, whereby said first ski, while momentarily airborne out of contact with the terrain, is urged by said spiral coil spring, adjacent said first horizontal hinge pin in said Tee-branched spider and said pair of pillow block bearings, to assume said nose-up attitude of $v_{u\ max}$=about 25° for tail-end-first impact with the terrain.

9. An articulated snow ski according to claim 8, wherein the widths of said first ski at the shovel section, the waist section and the tail, respectively, are about the same as the corresponding widths of said second ski.

10. An articualted snow ski according to claim 9, wherein said widths are: about 6 inches at said shovel section, about 5.5 inches at said waist section, and about 5.75 inches, respectively.

11. An articulated snow ski according to claim 10, wherein the ratio $L_1/L_2$ of the track lengths of said first and second skis, respectively, is from about 0.6 to about 0.7.

12. An articulated snow ski according to claim 11, wherein the ratio $L_1/L_2$ of the track lengths of said first and second skis, respectively, is about 0.64.

13. An articulated snow ski according to claim 12, wherein said second ski has a track length of about $L_2 = 42''$ (1067 mm).

14. An articulated snow ski according to claim 13, wherein a brake extension body is attached to said tail of said second ski by a front hinge wing secured to said tail of said second ski, a second horizontal hinge pin, a rear hinge wing secured to said brake extension body and a coil spring adapted to hold said brake extension body normally raised out of contact with the snow and engageable with the snow for braking, at skier's option, by foot pressure.

15. An articulated snow ski according to claim 14, wherein said brake extension body is provided along each side with a depending vertical wall, each said depending wall converging rearwardly for the last about 3'' to form a constricted outlet at the trailing end of said brake extension body, whereby the snow that is captured within the brake extension body is compressed and discharged through said outlet during braking.

16. An articulated snow ski according to claim 15, wherein the top surface of said second ski, starting at said first toe cup and continuing rearward to said second hinge means and resuming thereafter over the top surface of said brake extension body, is covered with an adherent, corrugated, rubber-like mat, whereby a non-slip surface is provided.

17. An articulated snow ski according to claim 16, wherein a ski binding is provided on said second ski, whereby the front foot of the skier is secured to said second ski.

18. An articulated snow ski according to claim 17, wherein is provided secure keeper means comprising a snap hook secured to said bearing fixture, said snap hook being adapted to engage the bottom face of said lower pivot pin boss, whereby said upper and lower pivot pins are prevented from bearing disengagement under airborne conditions.

19. An articulated snow ski according to claim 18, wherein said secure keeper means comprises, in combination:

a first spacer sleeve welded to said case tube adjacent the top face of said upper pivot pin plate, a rotary collar slip-fitted over said case tube adjacent said first spacer sleeve, a second spacer sleeve welded to said case tube adjacent said rotary collar, a secure keeper arm radially extending from said rotary collar adapted to engage the top face of said upper pivot pin boss.

a threaded hole in said rotary collar and a knurled set screw adapted to threadedly engage said threaded hole.

whereby said steering shaft is secured to said bearing fixture by indexing said secure keeper arm into registry with the top face of the upper one of said pair of pivot pin bosses and locking said rotary collar into said registry position by tightening said knurled set screw against said case tube

* * * * *

UNITED STATES PATENT AND TRADEMARK OFFICE
CERTIFICATE OF CORRECTION

PATENT NO. : 4,773,659

DATED : September 27, 1988

INVENTOR(S) : Rygiel

It is certified that error appears in the above-identified patent and that said Letters Patent is hereby corrected as shown below:

In col. 11, line 66, change "saud" to "said".

In col. 13, line 8, change "62" to "β".

In col. 13, line 18, insert "adjacent to and rearwardly of" between "respectively," and "said".

In col. 13, line 33, insert "at said tail" between "inches" and ", respectively".

Signed and Sealed this

Seventh Day of March, 1989

Attest:

DONALD J. QUIGG

Attesting Officer

Commissioner of Patents and Trademarks